(12) United States Patent
Wang et al.

(10) Patent No.: US 8,300,838 B2
(45) Date of Patent: Oct. 30, 2012

(54) METHOD AND APPARATUS FOR DETERMINING A MODELED ROOM IMPULSE RESPONSE

(75) Inventors: Semyung Wang, Gwangju (KR); Mincheol Shin, Daejeon (KR)

(73) Assignee: Gwangju Institute of Science and Technology, Gwangju (KR)

( * ) Notice: Subject to any disclaimer, the term of this patent is extended or adjusted under 35 U.S.C. 154(b) by 1023 days.

(21) Appl. No.: 12/195,283

(22) Filed: Aug. 20, 2008

(65) Prior Publication Data

US 2009/0052680 A1 Feb. 26, 2009

(30) Foreign Application Priority Data

Aug. 24, 2007 (KR) ........................ 10-2007-0085402

(51) Int. Cl.
 *H04R 29/00* (2006.01)
(52) U.S. Cl. ................ 381/59; 381/58; 381/17; 381/56; 381/57; 381/310; 381/61; 381/63; 73/587; 73/586; 708/420; 708/300
(58) Field of Classification Search ..................... 381/59, 381/58, 17, 56, 57, 310, 61, 63; 73/587; 73/586; 708/420, 300
See application file for complete search history.

(56) References Cited

U.S. PATENT DOCUMENTS

| | | | |
|---|---|---|---|
| 5,544,249 A * | 8/1996 | Opitz | 381/63 |
| 6,707,918 B1 * | 3/2004 | McGrath et al. | 381/58 |
| 6,738,479 B1 * | 5/2004 | Sibbald et al. | 381/17 |
| 7,152,082 B2 * | 12/2006 | McGrath | 708/300 |
| 8,005,228 B2 * | 8/2011 | Bharitkar et al. | 381/17 |
| 2003/0172097 A1 * | 9/2003 | McGrath | 708/300 |
| 2006/0050891 A1 * | 3/2006 | Bharitkar | 381/59 |
| 2006/0227977 A1 * | 10/2006 | Rui et al. | 381/1 |
| 2007/0237335 A1 * | 10/2007 | O'Sullivan | 381/63 |
| 2008/0205667 A1 * | 8/2008 | Bharitkar et al. | 381/103 |
| 2008/0292108 A1 * | 11/2008 | Buck et al. | 381/63 |
| 2010/0278351 A1 * | 11/2010 | Fozunbal et al. | 381/66 |

FOREIGN PATENT DOCUMENTS

| | | |
|---|---|---|
| EP | 2 028 884 A1 * | 2/2009 |
| JP | 61296896 A | 12/1986 |
| JP | 6043890 A | 2/1994 |
| JP | 2003271165 A | 9/2003 |

* cited by examiner

*Primary Examiner* — Alexander O. Williams

(57) ABSTRACT

A method of modeling a room impulse response according to an embodiment of the invention includes receiving a sound pressure signal that is obtained by a microphone when an impulse-type sound source is excited and detecting a room impulse response; determining boundaries between a plurality of intervals of the room impulse response such that the room impulse response is divided into the plurality of intervals on a time domain; and modeling the room impulse response for each of the plurality of divided intervals using at least two different modeling schemes.

21 Claims, 10 Drawing Sheets

[FIG. 1]
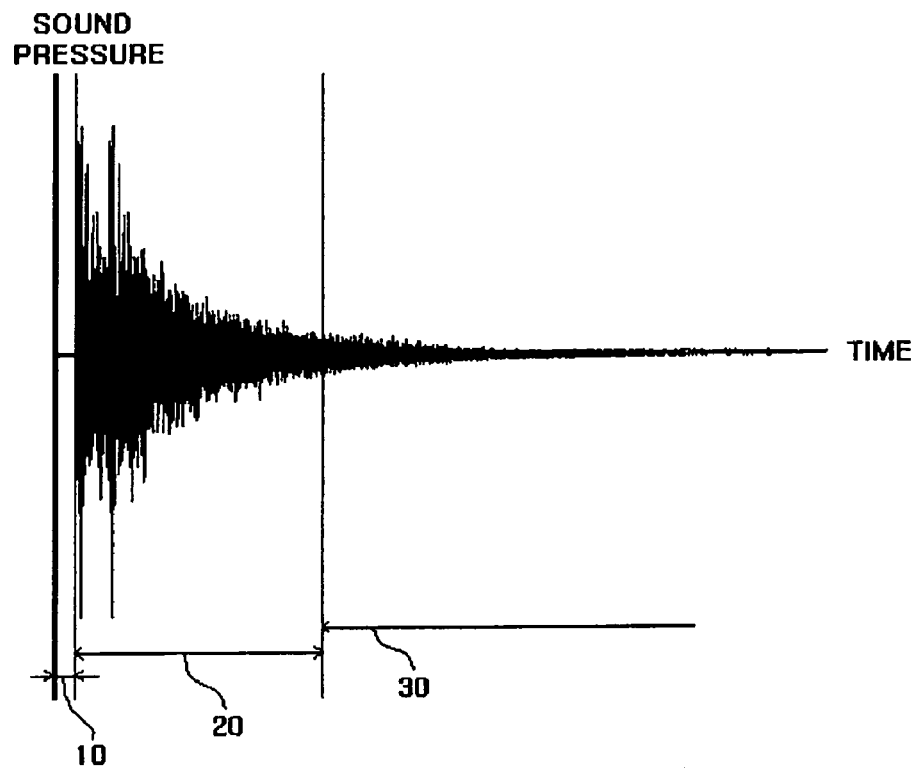
[FIG. 2]
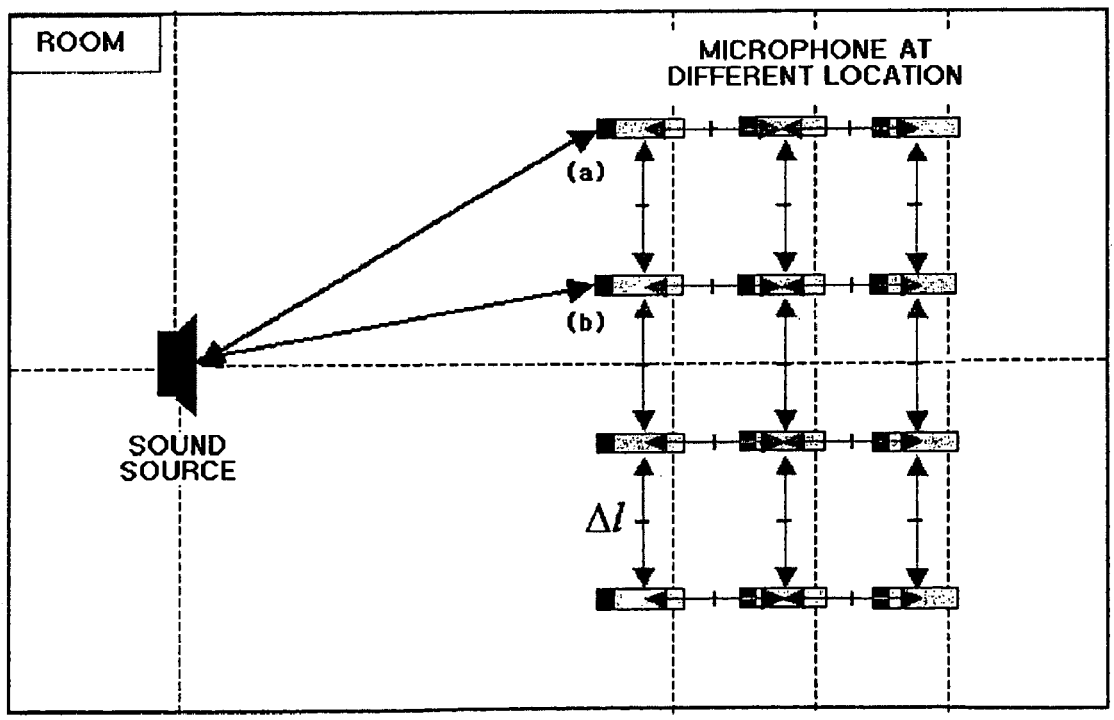

[FIG. 3]
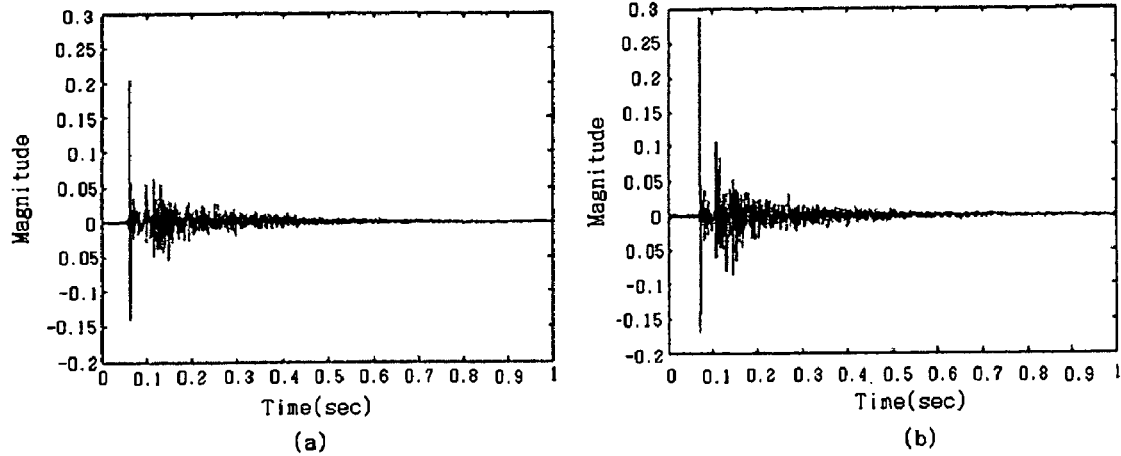
(a)    (b)
[FIG. 4]
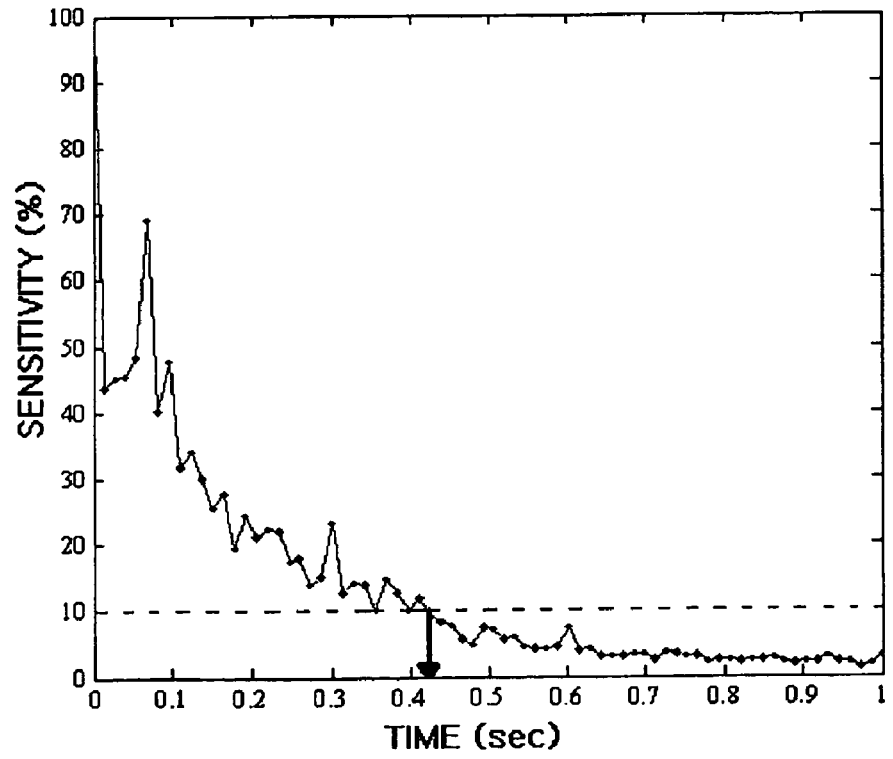

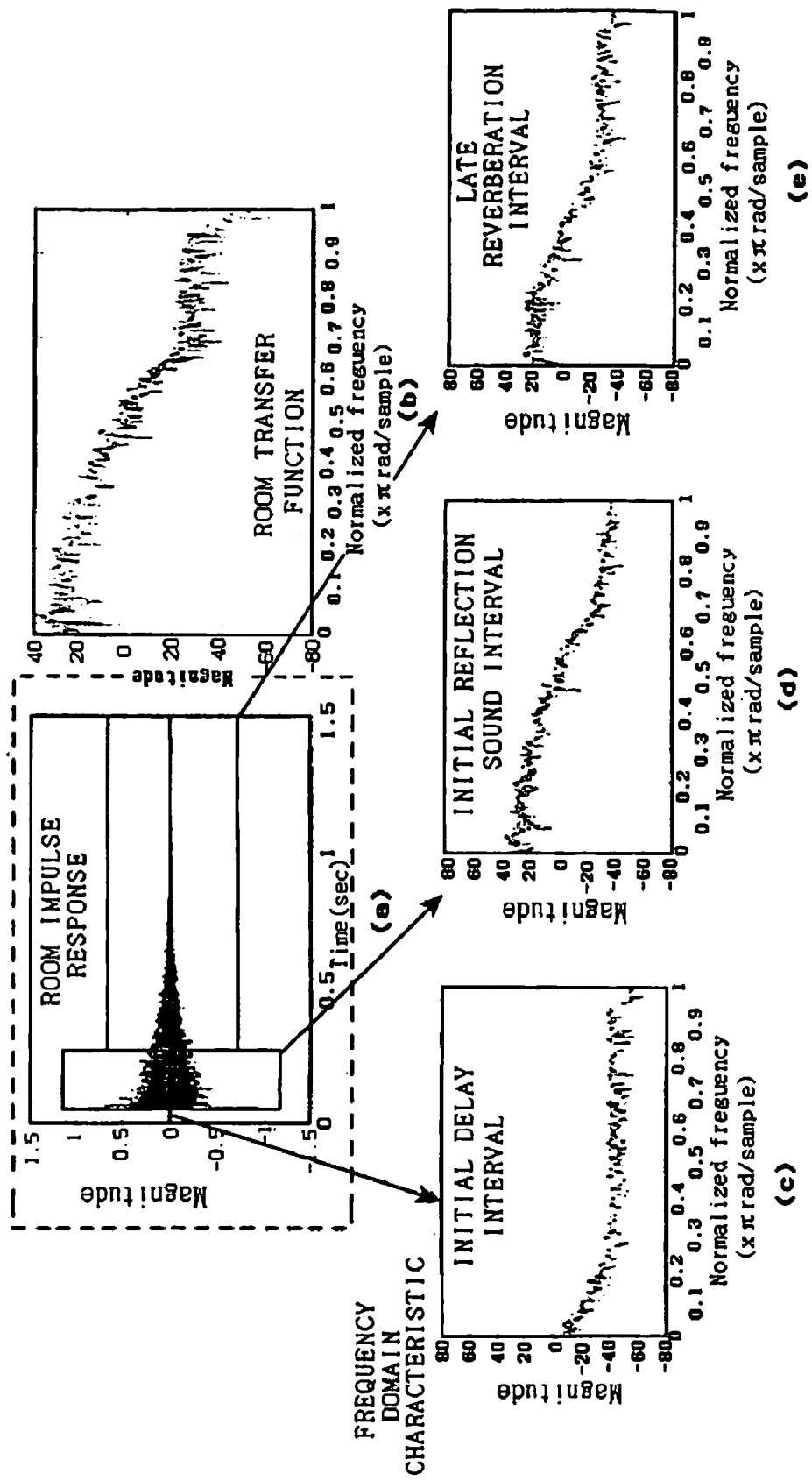
[FIG. 5]

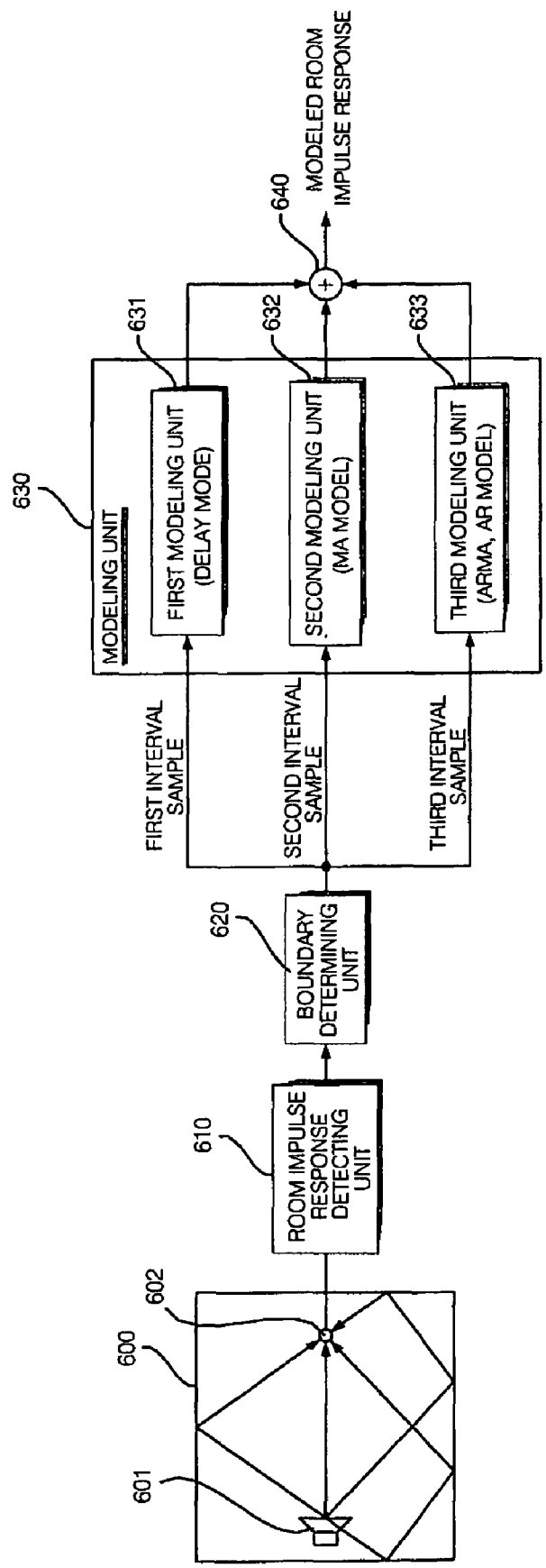
[FIG. 6]

[FIG. 7]
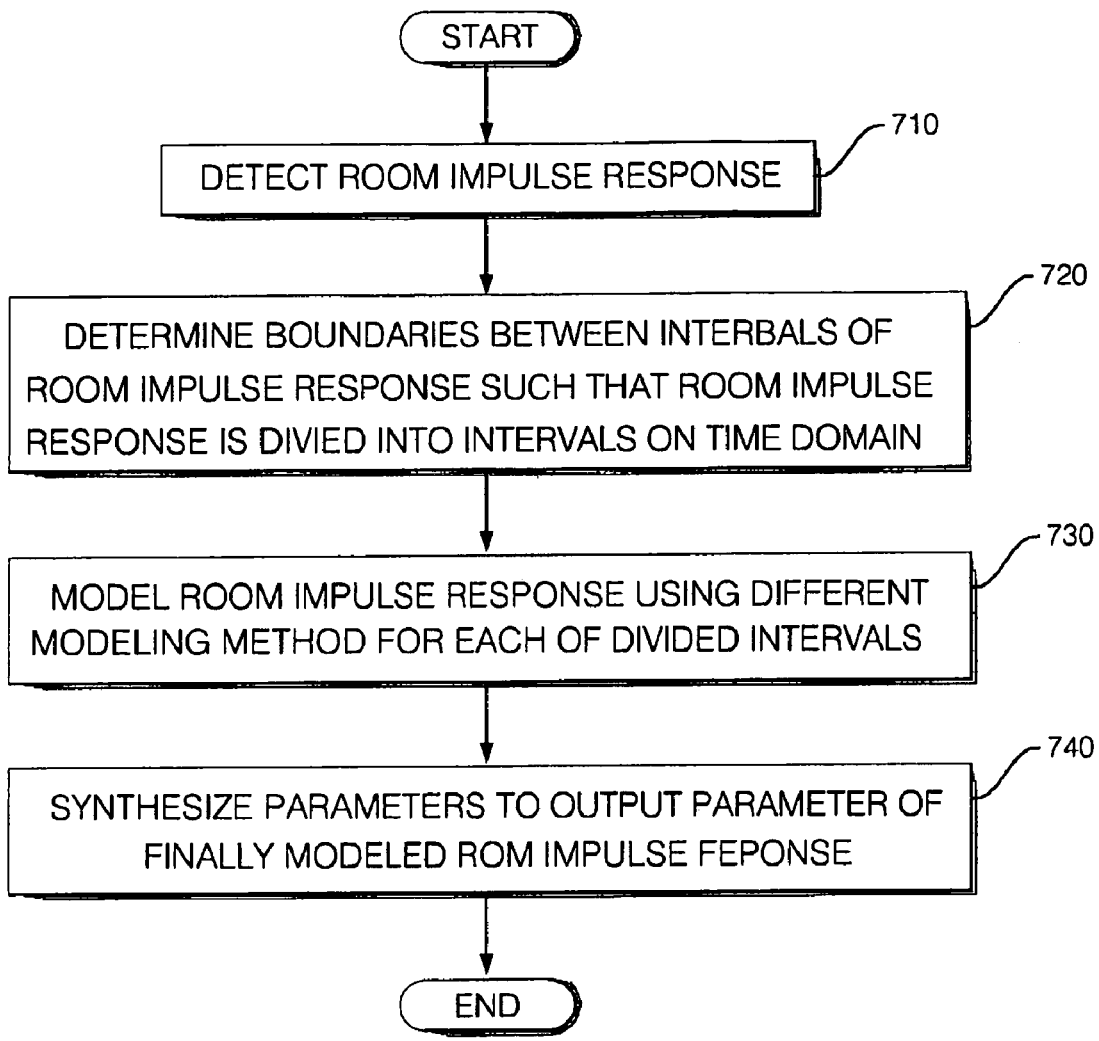

[FIG. 8]
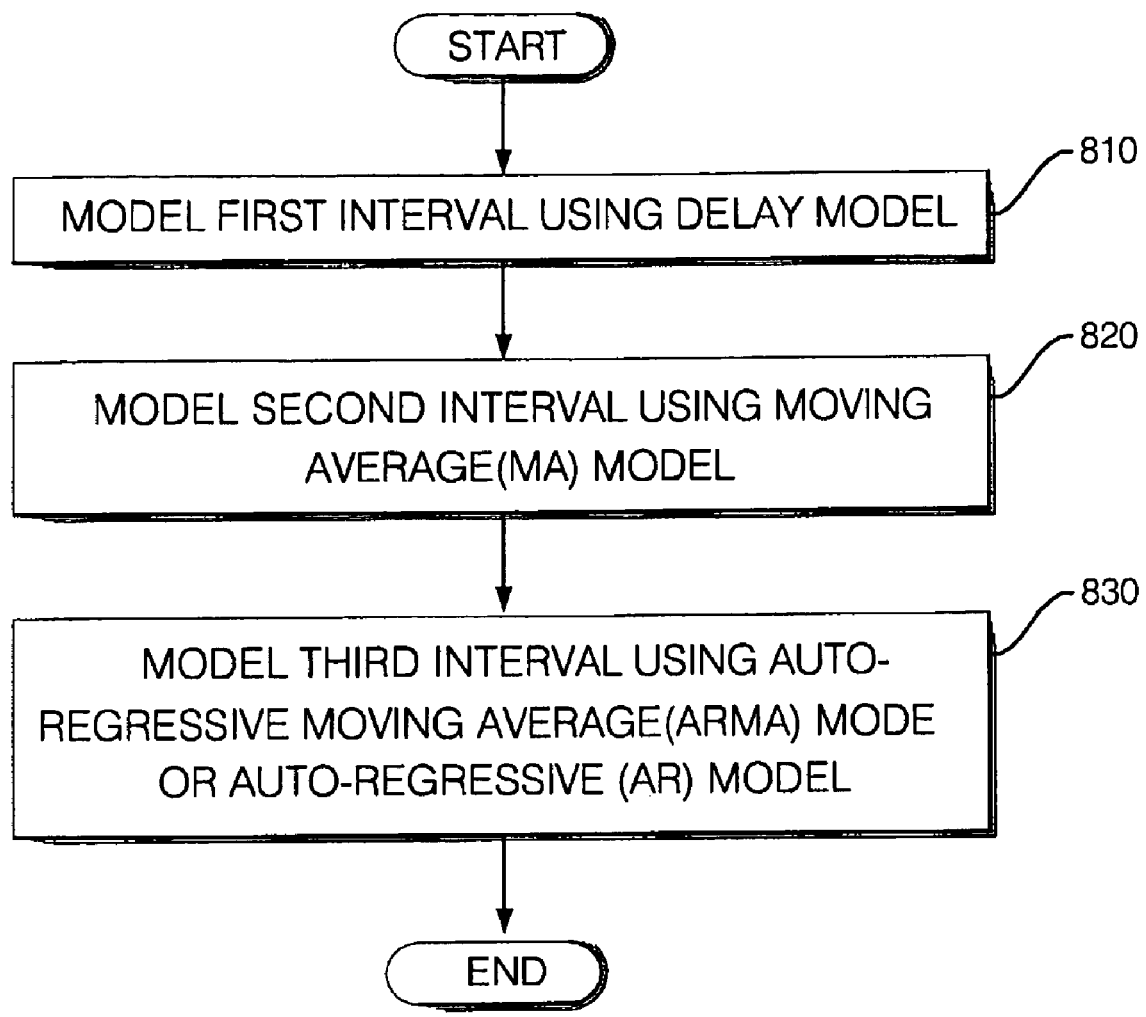

[FIG. 9]
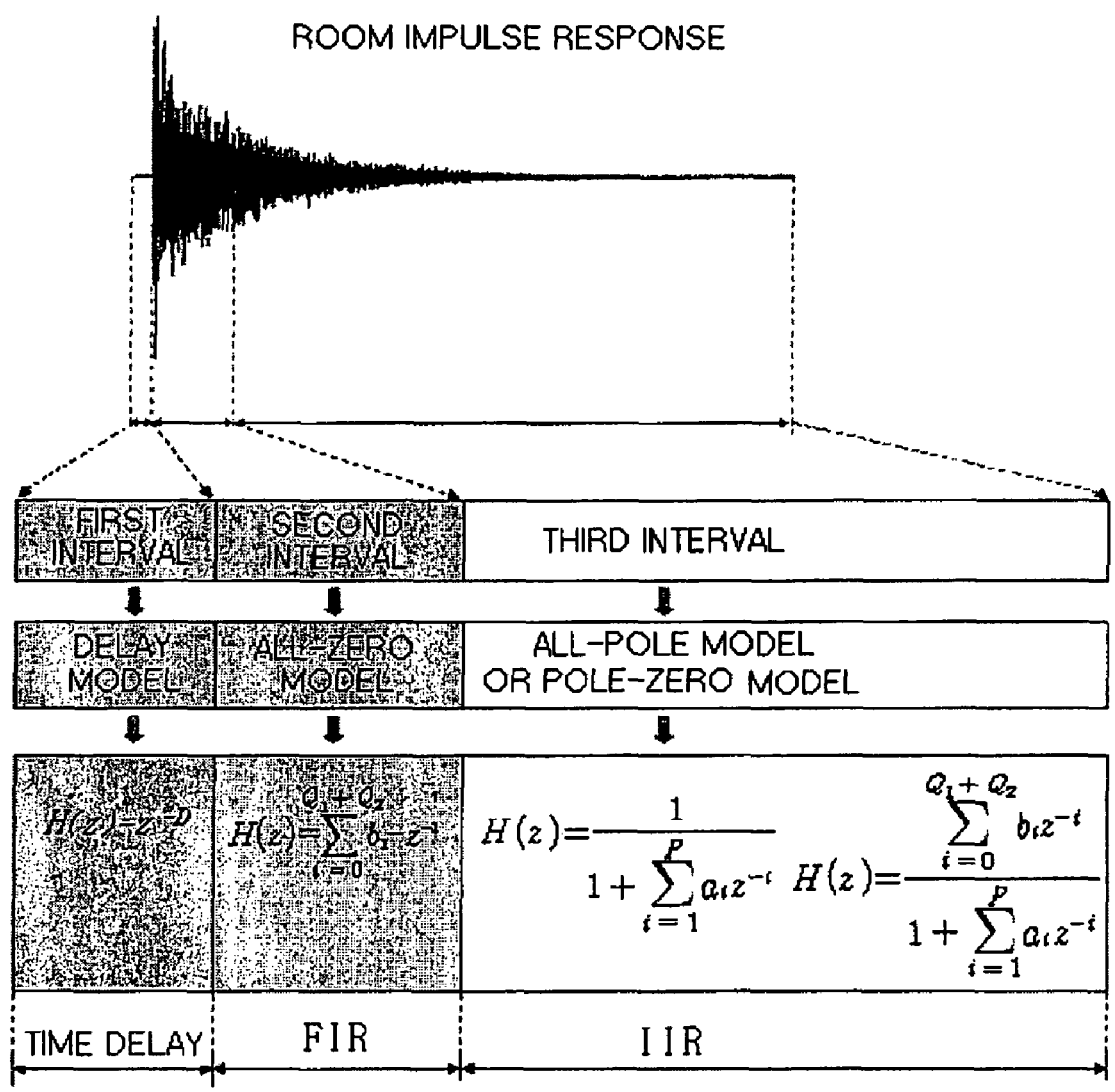

[FIG. 10]
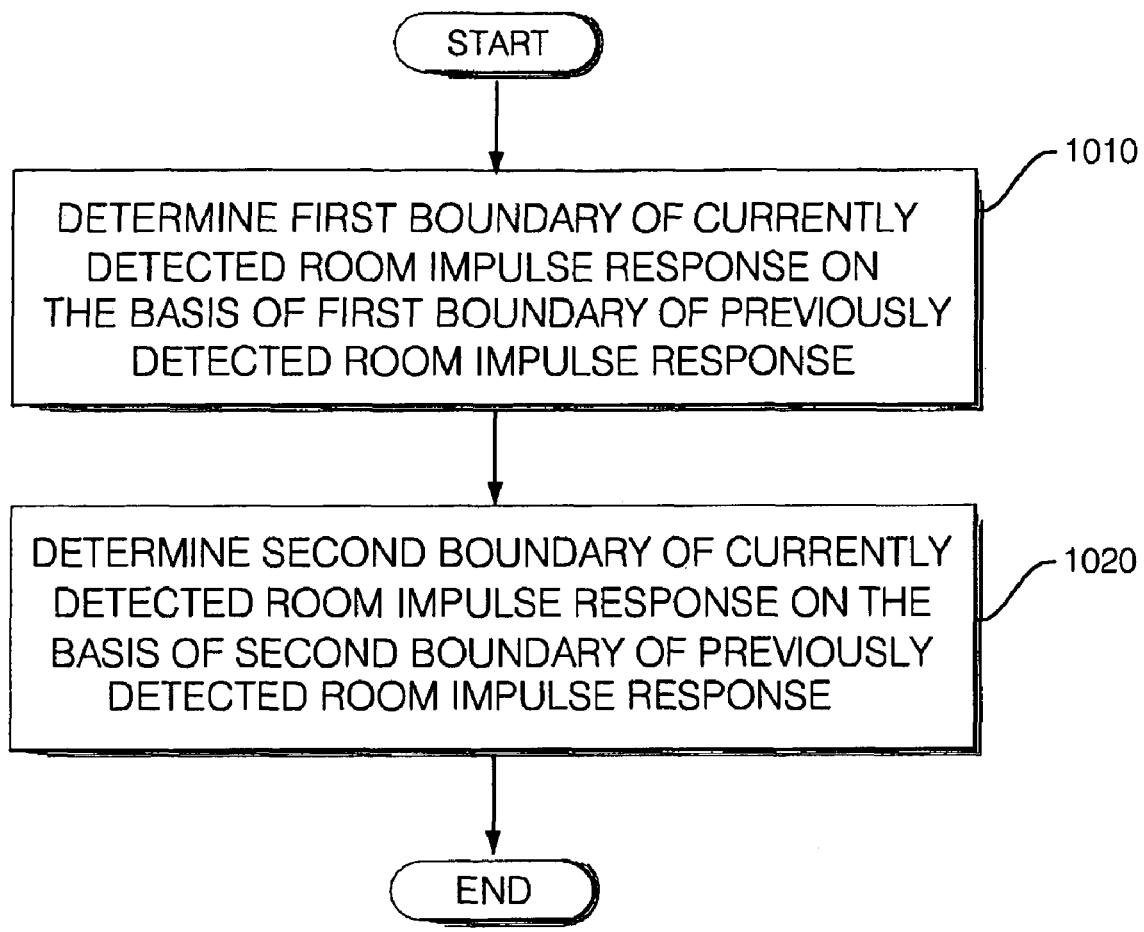

[FIG. 11]
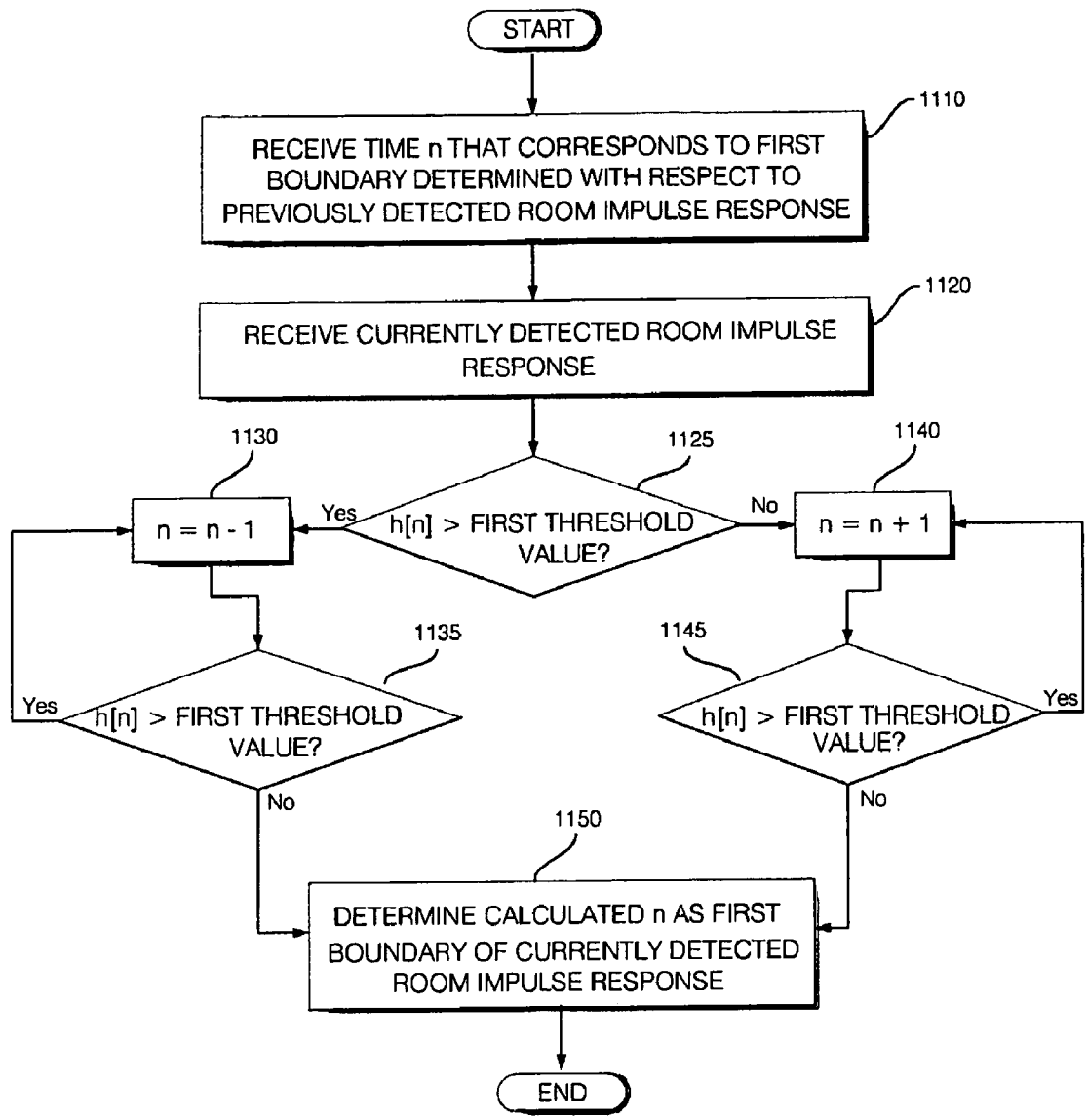

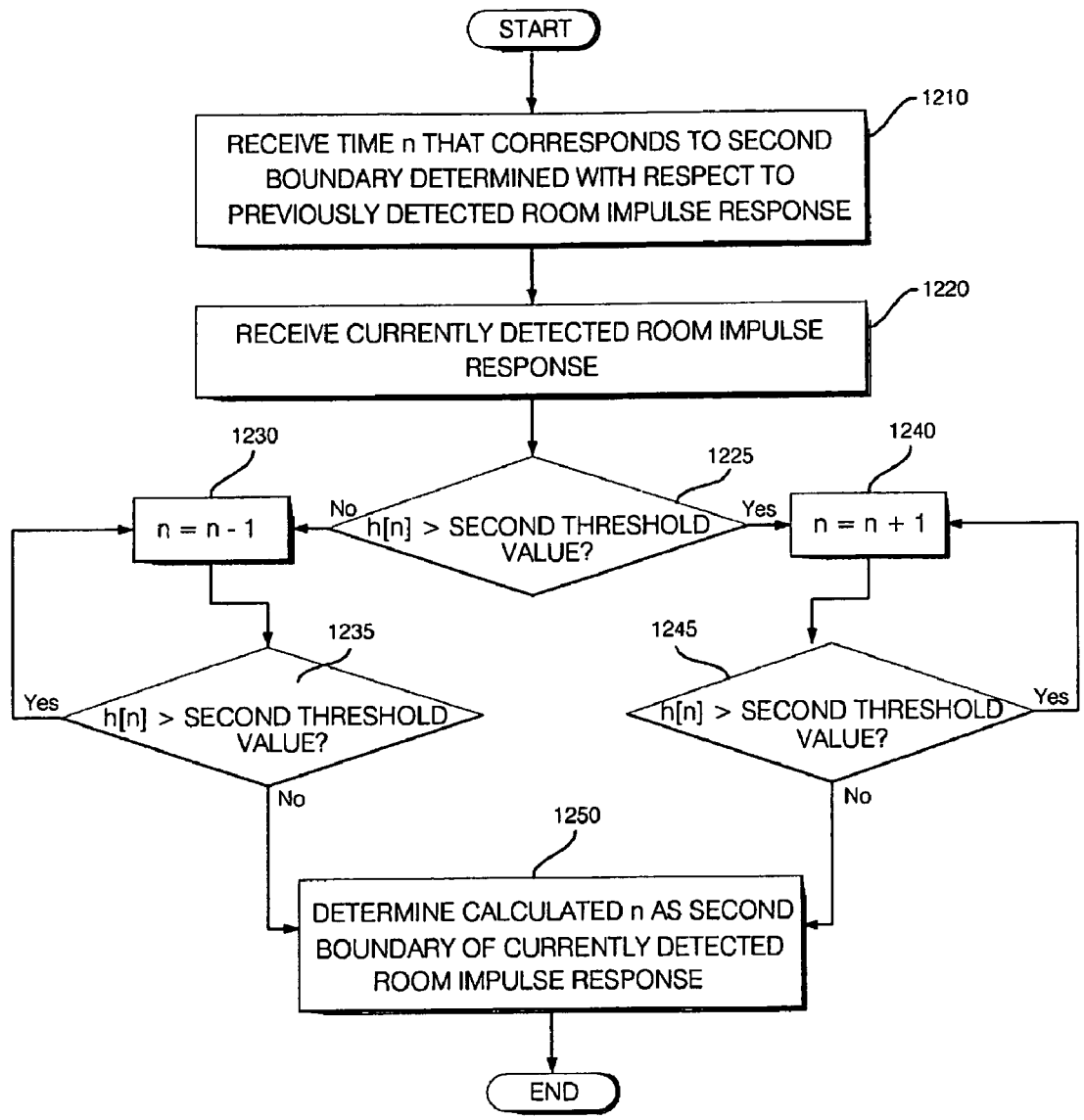
[FIG. 12]

METHOD AND APPARATUS FOR DETERMINING A MODELED ROOM IMPULSE RESPONSE

BACKGROUND OF THE INVENTION

1. Technical Field

The present invention relates to a method and apparatus for modeling a room impulse response, and more particularly, to a method and apparatus for modeling a room impulse response that can decrease the number of parameters while maintaining accuracy.

2. Related Art

In general, most of sounds that people daily hear are reverberations, that is, sounds where reflection sounds are mixed. As in a free space, it is impossible to imagine the case where people hear only sounds that are output from sound sources, except for special cases. When people hear sounds in a room, the people feel a space sense, such as the size of an indoor space and the quality of the material of walls, according to a degree of reverberations. In broadcasting and music industries, an attempt to reproduce natural and actual sounds by adding artificially synthesized reverberations to indigenous sounds recorded in a dead room has been made. In recent years, a study has been performed to develop a 3D sound field system to regenerate natural spatial hearing.

A method that is most generally used to obtain a reverberation effect measures a room impulse response in a room that has desired reverberations and performs convolution on the measured room impulse response and indigenous sounds recorded in a dead room. The room impulse response means a sound press that is measured at a location of a listener, when a sound source is excited as an impulse function. In order to model the room impulse response, various methods that include a finite impulse response (FIR)-based all-zero model and an infinite impulse response (IIR)-based pole-zero model are used. In general, a large number of parameters are required to accurately model the room impulse response. In the related art, a sound characteristic of a measured room impulse response is not considered and the entire room impulse response is modeled using one modeling method on a time domain or a frequency domain. When the number of parameters needed to model the room impulse response increases, a data process time and a required memory capacity or processor capacity increase, and a high-performance processor is required. As a result, there occur a lot of restrictions when sound reproduction is processed in real time.

SUMMARY OF THE INVENTION

Accordingly, it is an object of the invention to provide a method and apparatus for modeling a room impulse response that can decrease the number of parameters while maintaining accuracy, when modeling the room impulse response.

In order to achieve the above-described object of the invention, according to an aspect of the invention, there is provided a method of modeling a room impulse response. The method includes receiving a sound pressure signal that is obtained by a microphone when an impulse-typed sound source is excited and detecting a room impulse response; determining boundaries between a plurality of intervals of the room impulse response such that the room impulse response is divided into the plurality of intervals on a time domain; and modeling the room impulse response using a different modeling method for each of the plurality of divided intervals.

The plurality of intervals may be divided in consideration of sound characteristics of the room impulse response over time. The plurality of intervals may include a first interval, a second interval, and a third interval. The first interval may indicate an initial delay of the room impulse response according to a distance between the sound source and the microphone, and the second and third intervals may be discriminated from each other according to sensitivity of the room impulse response with respect to a positional change of the sound source or the microphone in an interval of the room impulse response other than the first interval.

According to another aspect of the invention, an apparatus for modeling a room impulse response includes a room impulse response detecting unit that receives a sound pressure signal that is obtained by a microphone when an impulse-typed sound source is excited and detects a room impulse response; a boundary determining unit that determines boundaries between a plurality of intervals of the room impulse response such that the room impulse response is divided into the plurality of intervals on a time domain; and a modeling unit that models the room impulse response using a different modeling method for each of the plurality of divided intervals.

According to still another aspect of the invention, there is provided a computer readable recording medium having a program stored therein to allow the above-described method to be executed.

According to the aspects of the invention, when a room impulse response is modeled, it is possible to considerably decrease the number of parameters while maintaining accuracy. Accordingly, when sounds are reproduced, it is possible to decrease a data process time or a required memory or processor capacity while accurately representing a sound characteristic in a room.

BRIEF DESCRIPTION OF THE DRAWINGS

FIG. 1 is a diagram illustrating an example of a room impulse response with respect to an impulse sound source in an arbitrary room;

FIG. 2 is a diagram illustrating an aspect of measuring a room impulse response while fixing a sound source but changing a location of a microphone in an arbitrary room;

FIGS. 3A and 3B are diagrams illustrating room impulse responses that are measured at locations (a) and (b) of FIG. 2, respectively;

FIG. 4 is a graph illustrating a change in positional sensitivity of a room impulse response calculated by Equation 1 in response to a sampling time;

FIGS. 5A to 5E are graphs illustrating results that are obtained by dividing a room impulse response into intervals on a time domain and analyzing frequency characteristics in the individual intervals, FIG. 6 is a block diagram illustrating an apparatus for modeling a room impulse response according to an embodiment of the invention;

FIG. 7 is a flowchart illustrating a method of modeling a room impulse response according to an embodiment of the invention;

FIG. 8 is a flowchart illustrating a specific example of Step S730 shown in FIG. 7;

FIG. 9 is a diagram illustrating an aspect where a room impulse response is modeled for each interval in accordance with an embodiment of the invention;

FIG. 10 is a flowchart illustrating a specific example of Step S720 shown in FIG. 7, when a room impulse response is continuously detected several times;

FIG. 11 is a flowchart illustrating a specific example of Step S1010 shown in FIG. 10; and FIG. 12 is a flowchart illustrating a specific example of Step S1020 shown in FIG. 10.

DESCRIPTION OF EXEMPLARY EMBODIMENT

The preferred embodiments of the invention will now be described more fully with reference to the accompanying drawings. However, in describing the present invention, when the specific description of the related known technology departs from the scope of the present invention, the detailed description of the corresponding known technology will be omitted.

Before describing the preferred embodiments of the invention, first, a sound characteristic of a room impulse response over time will be described. FIG. 1 is a diagram illustrating an example of a room impulse response with respect to an impulse sound source in an arbitrary room. As shown in FIG. 1, the room impulse response has an initial delay interval 10 that is generated due to a distance between a sound source and a microphone (listener). The room impulse response may be divided into an interval 20 where an initial reflection sound is mainly generated and an interval 30 where a late reverberation is mainly generated.

First, in the initial delay interval 10, the room impulse response indicates only the amount of delay and does not indicate a degree of a sound pressure. Accordingly, in the initial delay interval 10, if the room impulse response is modeled using a simple delay model, it is possible to decrease the amount of parameters according to a modeling result.

Next, a sound characteristic of the room impulse response in the intervals after the initial delay interval 10 will be described. FIG. 2 is a diagram illustrating an aspect of measuring a room impulse response while fixing a sound source but changing a location of a microphone in an arbitrary room. FIGS. 3A and 3B are diagrams illustrating room impulse responses that are measured at locations (a) and (b) of FIG. 2, respectively. Referring to FIGS. 3A and 3B, it can be seen that room impulse responses that are measured at different locations are different from each other. This results from a difference in a distance between a sound source and a microphone and a sound reflection path. In FIG. 2, the location of the microphone is changed while the sound source is fixed. However, even if the location of the sound source is changed while the microphone is fixed, it is possible to obtain different types of room impulse responses.

As shown in FIGS. 3A and 3B, since the room impulse responses that are measured at the different locations are different from each other, it may be considered how much the room impulse response changes according to a positional change. Accordingly, an index that indicates sensitivity of the room impulse response according to a positional change of the sound source or the microphone is defined by the following Equation 1, and it is assumed that the index is positional sensitivity of the room impulse response, for convenience of explanation. The following Equation 1 shows a ratio of a variation in the room impulse response according to the positional change of the microphone to a positional variation.

$$h'[n] = \frac{|h_{l_0+\Delta l}[n] - h_{l_0}[n]|}{\Delta l}$$

$$h'_N[n] = \frac{h'[n]}{\max(h'[n])} \times 100(\%)$$

[Equation 1]

In this case, n indicates a sampling time, h'[n] indicates positional sensitivity of the room impulse response, a subscript $l_0$ indicates a reference location, and $\Delta l$ indicates a positional variation. $h_N'[n]$ indicates normalized positional sensitivity and is a value that is expressed in a unit of %.

FIG. 4 is a graph illustrating the normalized positional sensitivity of the room impulse response calculated by Equation 1 according to the sampling time. Referring to FIG. 4, it can be seen that the positional sensitivity of the room impulse response changes according to the sampling time, that is, a value of positional sensitivity decreases over time. If the description is given with reference to FIGS. 1 and 4, the positional sensitivity in the interval 30 where the late reverberation is mainly generated has a value relatively smaller than that of the positional sensitivity in the interval 20 where the initial reflection sound is mainly generated.

The initial reflection sound is a sound in which a sound generated from an impulse sound source is reflected on a reflection surface, such as a wall surface or a ceiling, and transmitted having a path relatively longer than that of a sound directly transmitted to listeners. As described above, the initial reflection sound is relatively sensitive to the positional change of the sound source or the microphone. The late reverberation is a sound that is obtained by overlapping reflection sources transmitted through various types of paths. The late reverberation is a sound in which some energy is absorbed on a reflection surface and a sound pressure is lowered. As described above, the late reverberation is not relatively sensitive to the positional change of the sound source or the microphone.

As such, since the positional sensitivity of the room impulse response changes over time, the interval after the initial delay interval 10 is divided according to the positional sensitivity of the room impulse response and adaptively modeled, thereby decreasing the number of parameters according to a modeling result. Therefore, in this invention, the interval after the initial delay interval 10 is divided into the interval 20 where the room impulse response is sensitive to the positional change of the sound source or the microphone, for example, as shown in FIG. 1, the initial reflection sound is mainly generated, and the interval 30 where the room impulse response is less sensitive to the positional change of the sound source or the microphone as compared with the interval 20, for example, as shown in FIG. 1, the late reverberation is mainly generated. In the interval 20, a modeling method that requires a large number of parameters but has high accuracy is used. In the interval 30, a modeling method that requires a small number of parameters without depending on accuracy is used.

FIGS. 5A to 5E are graphs illustrating results that are obtained by dividing a room impulse response into intervals on a time domain and analyzing frequency characteristics in the individual intervals. FIG. 5A shows a room impulse response in an arbitrary room and FIG. 5B shows a room transfer function that indicates a characteristic of a room impulse response on a frequency domain. FIGS. 5B, 5C, and 5D are graphs illustrating frequency domain characteristics in an initial delay interval, an initial reflection sound interval, and a late reverberation interval that are obtained by dividing the room impulse response shown in FIG. 5A. Like this, in view of the fact that the frequency characteristic of the room impulse response can be analyzed for each of the intervals on the time domain, it can be seen that the room impulse response is divided into the intervals on the time domain and then modeled.

FIG. 6 is a block diagram illustrating an apparatus for modeling a room impulse response according to an embodiment of the invention. Referring to FIG. 6, an apparatus for modeling a room impulse response includes a microphone 602, a room impulse response detecting unit 610, a boundary determining unit 620, a modeling unit 630, and a synthesizing unit 640. The operation of the apparatus for modeling a room impulse response according to this embodiment will be described with reference to FIG. 7, which shows a flowchart of a method of modeling a room impulse response according to an embodiment of the invention.

The microphone 602 obtains a sound pressure signal when an impulse-typed sound source 601 is excited in an arbitrary room 600, and the room impulse response detecting unit 610 receives the sound pressure signal that is obtained by the microphone 602 and detects the room impulse response (S710).

The boundary determining unit 620 determines boundaries between a plurality of intervals of the room impulse response such that the room impulse response, which is detected by the room impulse response detecting unit 610, is divided into the plurality of intervals in consideration of a sound characteristic over time on a time domain (S720). In this embodiment, the boundary determining unit 620 determines boundaries between intervals of the room impulse response such that the room impulse response is divided into the first interval, which indicates the initial delay of the room impulse response according to a distance between the sound source 601 and the microphone 602, and the second and third intervals, which correspond to intervals other than the first interval and are divided according to the positional sensitivity of the room impulse response, as described above. In this case, the first interval is the same as the initial delay interval 10 shown in FIG. 1.

Hereinafter, a boundary between the first interval and the second interval is represented as a first boundary and a boundary between the second interval and the third interval is represented as a second boundary, for convenience of explanation.

When determining the first boundary, the boundary determining unit 620 may inspect whether a level of the room impulse response becomes a predetermined level or more while scanning the room impulse response over time and determine the first boundary. Further, when determining the second boundary, the boundary determining unit 620 may determine the boundary between the second interval and the third interval such that the second interval becomes an interval where a value of the positional sensitivity of the room impulse response is equal to or larger than a predetermined value and the third interval becomes an interval where a value of the positional sensitivity is smaller than the predetermined value. Referring to FIG. 4 again, it can be seen that time, which corresponds a point at which a value of the positional sensitivity of the room impulse response becomes a predetermined threshold value, for example, 10%, is approximately 0.42 sec. Accordingly, when the predetermined threshold value is set to 10%, the boundary determining unit 620 determines the second boundary as a point of 0.42 sec.

If the boundaries between the intervals of the room impulse response are determined by the boundary determining unit 620, the modeling unit 630 performs modeling by applying a different modeling method to a sample of each of the intervals for each interval (S730).

In this embodiment, the modeling unit 630 includes a first modeling unit 631, a second modeling unit 632, and a third modeling unit 633, as shown in FIG. 6. The operation of the modeling unit 630 that has the above structure will be described with reference to FIG. 8, which shows a flowchart illustrating a specific example of Step S730.

The first modeling unit 631 receives a sample of the first interval of the room impulse response from the boundary determining unit 620 and performs modeling using a delay model that is represented by the following Equation 2 (S810).

$$H(z)=z^{-D} \quad \text{[Equation 2]}$$

In this case, D indicates the number of samplings that are included in the first interval.

The second modeling unit 632 receives a sample of the second interval of the room impulse response from the boundary determining unit 620 and performs modeling using a moving average (MA) model (All-zero model) that is represented by the following Equation 3 (S820).

$$H(z) = Cz^{-Q_1}\prod_{i=1}^{Q_2}(1-q_iz^{-1}) = \sum_{i=0}^{Q_1+Q_2}b_iz^{-i} \quad \text{[Equation 3]}$$

The third modeling unit 633 receives a sample of the third interval of the room impulse response from the boundary determining unit 620 and performs modeling using any one of an auto-regressive moving average (ARMA) model (pole-zero model) and an auto-regressive (AR) model (All-pole model) that are represented by the following Equations 4 and 5 (S830).

$$H(z) = Cz^{-Q_1}\frac{\prod_{i=1}^{Q_2}(1-q_iz^{-1})}{\prod_{i=1}^{P}(1-p_iz^{-1})} = \frac{\sum_{i=0}^{Q_1+Q_2}b_iz^{-i}}{1+\sum_{i=1}^{P}a_iz^{-i}} \quad \text{[Equation 4]}$$

$$H(z) = \frac{1}{1+\sum_{i=1}^{P}a_iz^{-i}} \quad \text{[Equation 5]}$$

Referring to FIG. 7 again, the synthesizing unit 640 synthesizes parameters that are generated as the modeling results from the first to third modeling units 631, 632, and 633 and outputs a parameter of a finally modeled room impulse response (S740).

FIG. 9 is a diagram illustrating an aspect where a room impulse response is modeled for each interval in accordance with an embodiment of the invention. At this time, transfer functions of the first interval, the second interval, and the third interval may be implemented by a time delay filter, a finite impulse response (FIR) filter, and an infinite impulse response (IIR) filter.

An all-zero model is a technique that is mainly used when modeling a room impulse response and enables modeling more accurate than a pole-zero model or an all-pole model, but requires a large number of parameters. In this embodiment, modeling using the all-zero model is performed with respect to only the second interval where a value of the positional sensitivity of the room impulse response is relatively large, different from the related art where the entire room impulse response is modeled using the all-zero model. In addition, accuracy is not considered as an important factor in the third interval where a value of the positional sensitivity of the room impulse response is relatively small. Therefore, in the third interval, modeling is performed using the pole-zero model or the all-pole model requiring a small number of parameters, thereby considerably decreasing the number of parameters.

Meanwhile, the room impulse response that is modeled according to this embodiment may be synthesized with an indigenous sound using a block convolution. In this case, the room impulse response may be divided into three blocks each having a different length, specifically, a first block corresponding to the first interval, a second block corresponding to the second interval, and a third block corresponding to the third interval and subjected to a block convolution together with the indigenous sound, thereby reproducing a sound.

The room impulse response detecting unit 610 may be configured such that it continuously detect the room impulse response several times in an environment where an indoor structure, a sound source or a location of a listener is changed. Hereinafter, a method in which the boundary determining unit 620 can efficiently determine the boundaries between the intervals in the above case will be described. FIG. 10 is a flowchart illustrating a specific example of Step S720 shown in FIG. 7, when a room impulse response detecting unit 610 continuously detects a room impulse response several times. According to this embodiment, the boundary determining unit 620 determines boundaries between intervals of a currently detected room impulse response on the basis of the boundaries between the intervals that have been determined with respect to the previously detected room impulse response. Referring to FIG. 10, the boundary determining unit 620 determines a first boundary of a currently detected room impulse response on the basis of the first boundary of the previously detected room impulse response (S1010) and a second boundary of the currently detected room impulse response on the basis of the second boundary of the previously detected room impulse response (S1020).

FIG. 11 is a flowchart illustrating a specific example of Step S1010 shown in FIG. 10.

The boundary determining unit 620 receives time n corresponding to the first boundary that has been determined with respect to the previously detected room impulse response (S1110) and receives the currently detected room impulse response (S1120).

Then, the boundary determining unit 620 determines whether a level h[n] of the currently detected room impulse response at the time n exceeds a first threshold value as a predetermined threshold value (S1125). When it is determined that the level exceeds the first threshold value, the process proceeds to Step S1130, and when it is determined that the level does not exceed the first threshold value, the process proceeds to Step S1140. In this case, the first boundary is a boundary between a portion where a signal does not exist and a portion where a signal exists, and thus it is preferable to use a value considerably smaller than a highest level of the room impulse response in order to accurately determine the first boundary. For example, when the highest level is 1, it is possible to use a value of 0.005 as the first threshold value.

When the level h[n] exceeds the first threshold value, it means that n is located at the right of the first boundary of the currently detected room impulse response. Accordingly, n is decreased by 1 in Step S1130, and it is determined whether the level h[n] exceeds the first threshold value in Step S1135. In this case, when it is determined that the level h[n] exceeds the first threshold value, the process returns to Step S1130, and when it is determined that the level h[n] does not exceed the first threshold value, n at the corresponding point of time is determined as the first boundary of the currently detected room impulse response (S1150).

When the level h[n] does not exceed the first threshold value, it means that n is located at the left of the first boundary of the currently detected room impulse response. Accordingly, n is increased by 1 in Step S1140, and it is determined whether the level h[n] is smaller than the first threshold value in Step S1145. In this case, when it is determined that the level h[n] is smaller than the first threshold value, the process returns to Step S1140, and when it is determined that the level h[n] is equal to or larger than the first threshold value, n at the corresponding point of time is determined as the first boundary of the currently detected room impulse response (S1150).

FIG. 12 is a flowchart illustrating a specific example of Step S1020 shown in FIG. 10.

The boundary determining unit 620 receives time n corresponding to the second boundary that has been determined with respect to the previously detected room impulse response (S1210) and receives the currently detected room impulse response (S1220).

Then, the boundary determining unit 620 determines whether a value of positional sensitivity h'[n] of the currently detected room impulse response at the time n exceeds a second threshold value as a predetermined threshold value (S1225). When it is determined that the value of the positional sensitivity h'[n] exceeds the second threshold value, the process proceeds to Step S1240, and when it is determined that the value of the positional sensitivity h'[n] does not exceed the second threshold value, the process proceeds to Step S1230. In this case, the second threshold value is a value of positional sensitivity of the room impulse response that becomes a criterion used to discriminate between the second interval and the third interval.

When the value of the positional sensitivity h'[n] exceeds the second threshold value, it means that n is located at the left of the second boundary of the currently detected room impulse response. Accordingly, n is increased by 1 in Step S1240, and it is determined whether the value of the positional sensitivity h'[n] exceeds the second threshold value in Step S1245. In this case, when it is determined that the value of the positional sensitivity h'[n] exceeds the second threshold value, the process returns to Step S1240, and when it is determined that the value of the positional sensitivity h'[n] does not exceed the second threshold value, n at the corresponding point of time is determined as the second boundary of the currently detected room impulse response (S1250).

When the value of the positional sensitivity h'[n] does not exceed the second threshold value, it means that n is located at the right of the second boundary of the currently detected room impulse response. Accordingly, n is decreased by 1 in Step S1230, and it is determined whether the value of the positional sensitivity h'[n] is smaller than the second threshold value in Step S1235. In this case, when it is determined that the value of the positional sensitivity h'[n] is smaller than the second threshold value, the process returns to Step S1230, and when it is determined that the value of the positional sensitivity h'[n] is not smaller than the first threshold value, n at the corresponding point of time is determined as the second boundary of the currently detected room impulse response (S1250).

As such, in the case where the room impulse response is continuously detected several times, when the boundaries between the intervals are determined, if using the boundaries between the intervals that have been determined with respect to the previously detected room impulse response, the boundaries between the intervals can be quickly and efficiently determined.

According to the embodiments of the invention that have the structure described above, it is possible to considerably decrease the number of parameters required for modeling while maintaining high accuracy in terms of performance of modeling on the room impulse response. Accordingly, it is possible to decrease a data process time or a required memory or processor capacity while accurately representing a room sound characteristic at the time of reproducing a sound. Further, a trade-off relationship between modeling performance and the number of parameters can be appropriately controlled by differently setting the boundary between the second interval and the third interval. For example, if a threshold value of the positional sensitivity that becomes a criterion of the boundary between the second interval and the third interval is set to a small value, it is possible to perform accurate modeling as compared with the case of increasing the number of parameters.

Meanwhile, the above-described embodiments of the invention may be written by computer executable programs, and implemented by a general digital computer that operates the computer executable programs using a computer readable recording medium. Examples of the computer readable recording medium include a magnetic storage medium (for example, a ROM, a floppy disk, a hard disk, and the like), an optical recoding medium (for example, a CD ROM, a DVD, and the like), and a storage medium using a carrier wave (for example, transmission using the Internet).

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects. The scope of the present invention is defined by the appended claims rather than by the description preceding them, and all changes and modifications that fall within metes and bounds of the claims, or equivalents of such metes and bounds are therefore intended to be embraced by the claims.

What is claimed is:

1. A method for determining a modeled room impulse response, comprising:
   receiving a sound pressure signal that is obtained by a microphone when an impulse-type sound source is excited and detecting a room impulse response;
   determining boundaries between a plurality of intervals of the room impulse response such that the room impulse response is divided into the plurality of intervals on a time domain; and
   modeling the room impulse response for each of the plurality of divided intervals to determine modeled room impulse response using at least two modeling schemes, wherein modeling schemes for at least two of the plurality of divided intervals are different from each other.

2. The method of claim 1, wherein the plurality of intervals are divided in consideration of sound characteristics of the room impulse response over time.

3. The method of claim 2, wherein the plurality of intervals includes a first interval, a second interval, and a third interval, and the first interval indicates an initial delay of the room impulse response according to a distance between the sound source and the microphone, and the second and third intervals are discriminated from each other according to sensitivity of the room impulse response with respect to a positional change of the sound source or the microphone in an interval of the room impulse response other than the first interval.

4. The method of claim 3, wherein the second interval is an interval where an index, which indicates the sensitivity of the room impulse response according to the positional change of the sound source or the microphone, is equal to or larger than a predetermined value, and the third interval is an interval where the index indicating the sensitivity is smaller than the predetermined value.

5. The method of claim 4, wherein the index is a ratio of a variation in the room impulse response according to the positional change of the sound source or the microphone to a positional variation thereof.

6. The method of claim 4, wherein the modeling of the room impulse response includes:
   modeling the first interval using a delay model;
   modeling the second interval using a moving average (MA) model; and
   modeling the third interval using one of an auto-regressive moving average (ARMA) model and an auto-regressive (AR) model.

7. The method of claim 4, wherein, in the receiving of the sound pressure signal and the detecting of the room impulse response the room impulse response is detected several times and in the determining of the boundaries between the intervals of the room impulse response, the boundaries between the intervals with respect to a currently detected first room impulse response are determined on the basis of the boundaries between the intervals that are determined with respect to a second room impulse response detected before the first room impulse response.

8. The method of claim 7, wherein the determining of the boundaries between the intervals of the room impulse response includes:
   determining a first boundary that is a boundary between the first interval and the second interval with respect to the first room impulse response; and
   determining a second boundary that is a boundary between the second interval and the third interval with respect to the first room" impulse response.

9. The method of claim 8, wherein, in the determining of the first boundary, a level of the first room impulse response at time that corresponds to the first boundary determined with respect to the second room impulse response is compared with a predetermined threshold value, and the first boundary is determined using the compared result.

10. The method of claim 8, wherein, in the determining of the second boundary, an index that indicates sensitivity of the first room impulse response according to the positional change of the sound source or the microphone at time that corresponds to the second boundary determined with respect to the second room impulse response is compared with a predetermined threshold value, and the second boundary is determined using the compared result.

11. A non-transitory computer readable recording medium having a program including computer executable code stored thereon, the computer readable recording medium comprising:
   code for detecting a room impulse response from a sound pressure signal that is obtained by a microphone when an impulse-typed type sound source is excited;
   code for determining boundaries between a plurality of intervals of the room impulse response such that the room impulse response is divided into the plurality of intervals on a time domain; and
   code for modeling the room impulse response for each of the plurality of divided intervals to determine modeled room impulse response using at least two modeling schemes, wherein modeling schemes for at least two of the plurality of divided intervals are different from each other.

12. An apparatus for determining modeled room impulse response, comprising:
   a room impulse response detecting unit that receives a sound pressure signal that is obtained by a microphone when an impulse-typed sound source is excited and detects a room impulse response;

a boundary determining unit that determines boundaries between a plurality of intervals of the room impulse response such that the room impulse response is divided into the plurality of intervals on a time domain; and a modeling unit that models the room impulse response for each of the plurality of divided intervals to determine modeled room impulse response using at least two modeling schemes, wherein modeling schemes for at least two of the plurality of divided intervals are different from each other.

13. The apparatus of claim 12, wherein the plurality of intervals are divided in consideration of sound characteristics of the room impulse response over time.

14. The apparatus of claim 13, wherein the plurality of intervals includes a first interval, a second interval, and a third interval, and the first interval indicates an initial delay of the room impulse response according to a distance between the sound source and the microphone, and the second and third intervals are discriminated from each other according to sensitivity of the room impulse response with respect to a positional change of the sound source or the microphone in an interval of the room impulse response other than the first interval.

15. The apparatus of claim 14, wherein the second interval is an interval where an index, which indicates the sensitivity of the room impulse response according to the positional change of the sound source or the microphone, is equal to or larger than a predetermined value, and the third interval is an interval where the index indicating the sensitivity is smaller than the predetermined value.

16. The apparatus of claim 15, wherein the index is a ratio of a variation in the room impulse response according to the positional change of the sound source or the microphone to a positional variation thereof.

17. The apparatus of claim 15, wherein the modeling unit includes:

a first modeling unit that models the first interval using a delay model;

a second modeling unit that models the second interval using a moving average (MA) model; and a third modeling unit that models the third interval using one of an auto-regressive moving average (ARMA) model and an auto-regressive (AR) model.

18. The apparatus of claim 15, wherein the room impulse response detecting unit detects the room impulse response several times, and the room impulse response detecting unit determines the boundaries between the intervals with respect to a currently detected first room impulse response on the basis of the boundaries between the intervals that are determined with respect to a second room impulse response detected before the first room impulse response.

19. The apparatus of claim 18, wherein, when determining a first boundary between the first interval and the second interval with respect to the first room impulse response, the boundary determining unit compares a level of the first room impulse response at time that corresponds to the first boundary determined with respect to the second room impulse response with a predetermined threshold value, and determines the first boundary using the compared result.

20. The apparatus of claim 18, wherein, when determining a second boundary between the second interval and the third interval with respect to the first room impulse response, the boundary determining unit compares an index that indicates sensitivity of the first room impulse response according to a positional change of the sound source or the microphone at time that corresponds to the second boundary determined with respect to the second room impulse response with a predetermined threshold value, and determines the second boundary using the compared result.

21. A method for determining a modeled room impulse response, comprising:

receiving a sound pressure signal that is obtained by a microphone when an impulse-type sound source is excited;

detecting a room impulse response;

determining a time domain boundary between first and second intervals of the room impulse response;

modeling a room impulse response for the first interval using a first modeling scheme; and modeling a room impulse response for the second interval using a second modeling scheme that is different from the first modeling scheme.

* * * * *